Figure 4:
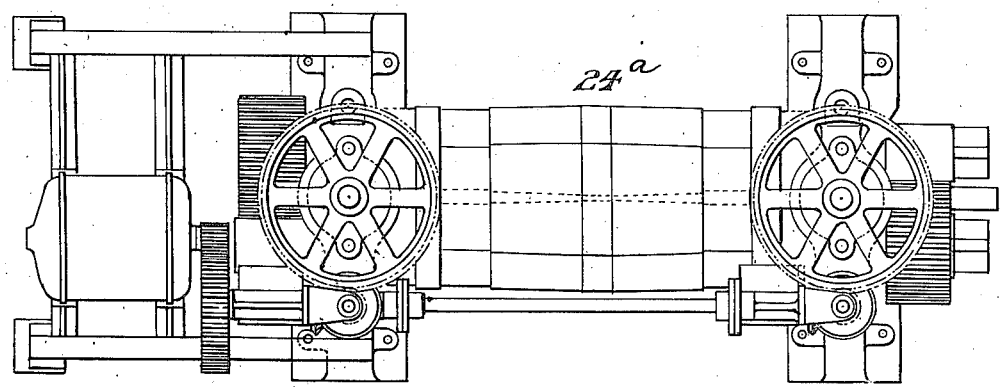

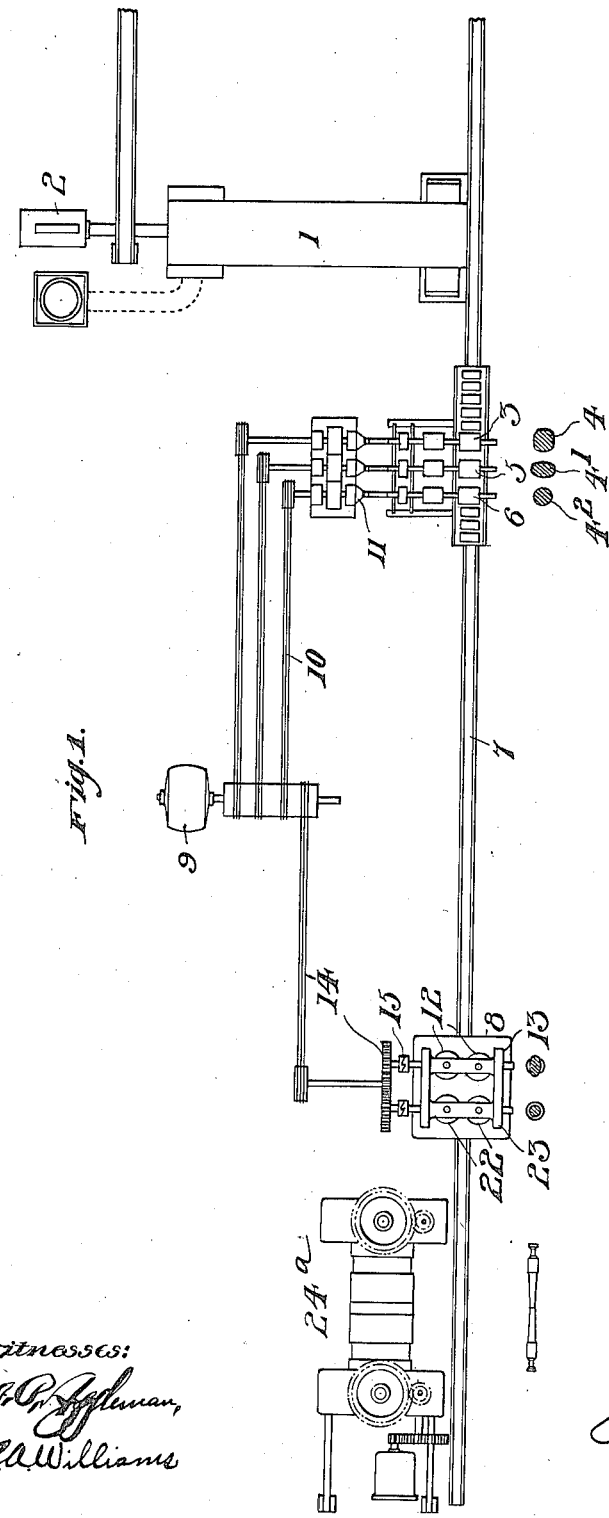

J. T. ROWLEY.
METHOD OF AND APPARATUS FOR FORMING AXLES.
APPLICATION FILED MAR. 22, 1909. RENEWED MAR. 21, 1918.
1,283,316.
Patented Oct. 29, 1918.
4 SHEETS—SHEET 2.
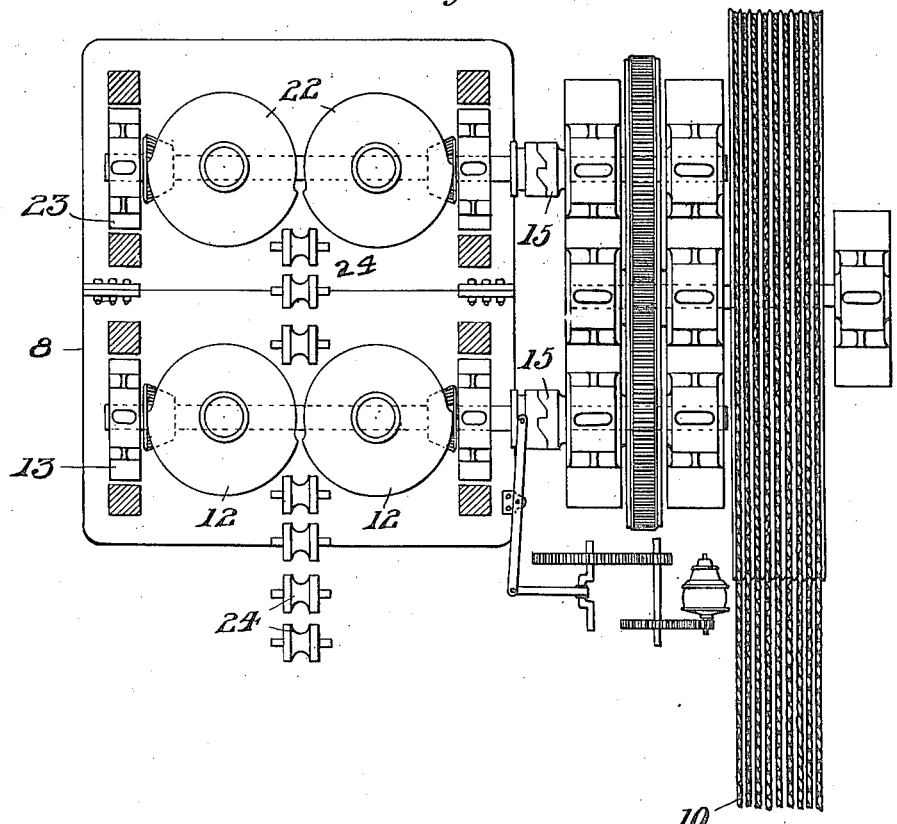
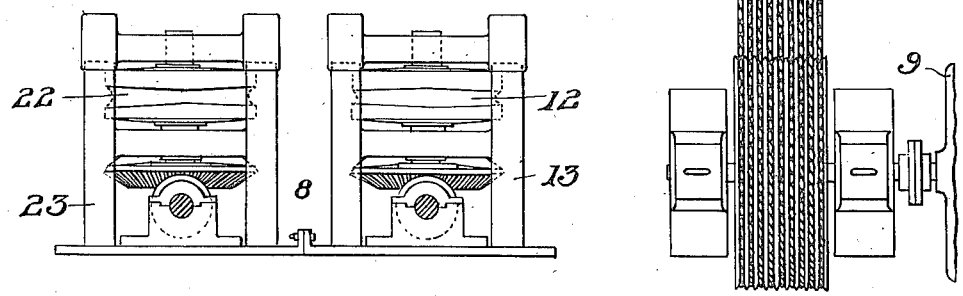

J. T. ROWLEY.
METHOD OF AND APPARATUS FOR FORMING AXLES.
APPLICATION FILED MAR. 22, 1909. RENEWED MAR. 21, 1918.
1,283,316.
Patented Oct. 29, 1918.
4 SHEETS—SHEET 4.
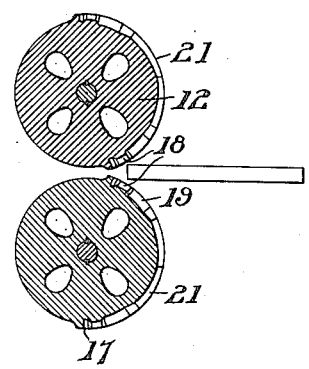
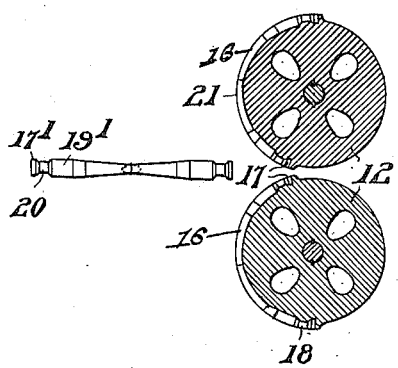
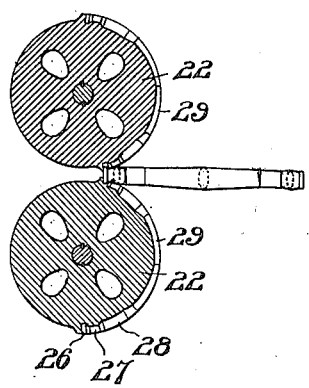
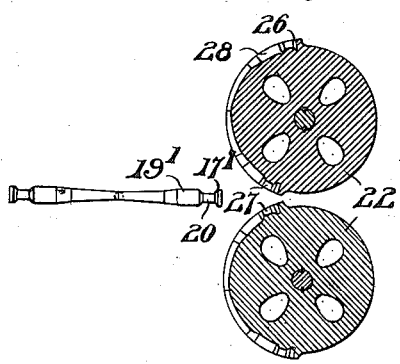
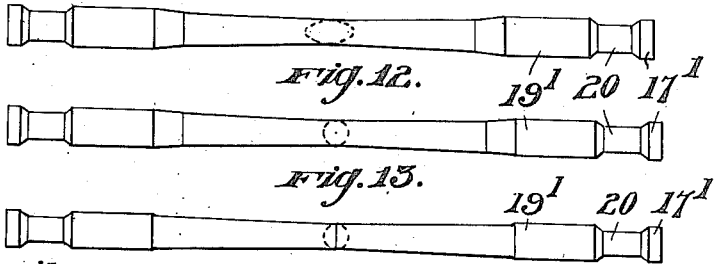

UNITED STATES PATENT OFFICE.

JOHN THOMAS ROWLEY, OF PITTSBURGH, PENNSYLVANIA, ASSIGNOR OF ONE-FOURTH TO JOHN H. RONEY, OF INGRAM, PENNSYLVANIA.

METHOD OF AND APPARATUS FOR FORMING AXLES.

1,283,316.  Specification of Letters Patent.  Patented Oct. 29, 1918.

Application filed March 22, 1909, Serial No. 484,956. Renewed March 21, 1918. Serial No. 223,871.

*To all whom it may concern:*

Be it known that I, JOHN THOMAS ROWLEY, a citizen of the United States, residing at Pittsburgh, in the county of Allegheny and State of Pennsylvania, have invented a new and useful Improvement in Methods of and Apparatus for Forming Axles, of which improvement the following is a specification.

My invention relates to improvements in methods and apparatus for forming axles. The object of my invention is to produce an axle of the standard type by rolling operation, *i. e.*, by an operation which involves the passage of a bar of suitable cross-section between rolls or moving surfaces, by which operation a collar is first formed on one end of said bar, then in successive order the bar is reduced and elongated at a point coinciding with one of the journal bearings of the subsequently formed axle, tapered from the wheel seat toward the center, longitudinally, where the greatest reduction and elongation is attained, then tapered from the center to the wheel seat; and finally the other portion of the bar coinciding with the other journal bearing is reduced and elongated, and a collar formed on the other end of the bar; these several steps being successively performed in a continuous operation.

I am aware that efforts have been made to produce an axle of this or similar type by a rolling operation, that is, by subjecting a bar of the requisite area or cross-section, to compression between sets of rolls, but, so far as I am aware, these efforts have involved the use of a mill in which the bar was laid lengthwise, and a method which required the greatest reduction to be performed in the beginning of the operation and at the center longitudinally of the bar, and without the requisite elongation, the result being that an irregularly shaped cavity was formed in the interior of the blank at such point, producing an imperfect and non-commercial axle. The object of the present invention is to produce an axle by a rolling operation in which this imperfection is avoided. I accomplish this object by means of my improved method, which consists in heating a billet, bar or rod of a requisite cross-section or area and passing the same longitudinally from end to end between two opposing rolls or disks, in which a die is formed, conforming substantially to the shape of the axle, the said die being so shaped that a collar is formed on the end of the bar first introduced between said rolls; the portion of the bar coinciding with the journal bearings of the subsequently formed axle being forced or pressed laterally, and reduced in thickness on a line vertical thereto, a distance sufficient to convert the bar from a round at such point to an oval, and the portion coinciding to the portion of the axle between the wheel seats is carried laterally and contracted on a line vertical thereto, a distance sufficient to convert the bar at such point from a round of uniform cross-section, to an oval wider and of less thickness at the center longitudinally thereof, than at other points; the part between the center and the wheel seat last acted upon by the rolls being somewhat thicker and consequently shorter than the other corresponding portion first acted upon by the rolls, for the purpose of providing sufficient metal at the proper points to insure the production of the axle at the finishing pass of uniform cross-section at all corresponding points and of uniform length in corresponding parts; then by passing the partially completed axle blank between two opposing rolls, in which a die is formed, conforming in shape, substantially, to that of the axle, to contract or flatten the previously widened portion coinciding with the journal bearings, in one direction, sufficient to convert said portion from an oval into a round, and simultaneously drawing out or elongating the same into a round of uniform cross-section, constituting the journal bearings, and by reducing and contracting and elongating the portion between the wheel seats sufficient to convert such portion into a round tapering from the center longitudinally to the wheel seats, and of less cross-section at the center than at other points; and finally straightening the axle thus formed in any suitable manner.

In the accompanying drawings I show apparatuses adapted to carry out or practice the method of forming axles herein described. In said drawings I also show a diagrammatic view of a plant which comprises a series of mills for producing the requisite form of bar for use in the manufacture of axles, in connection with my improved axle forming mill, also a device or mill for straightening the axle when formed.

Figure 5:
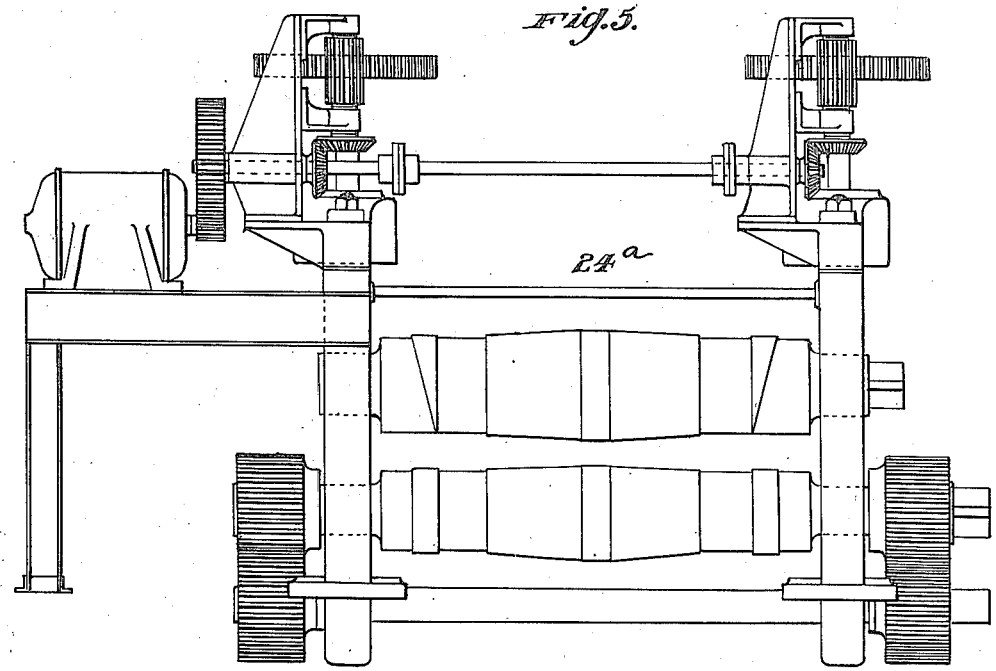

In said drawings, Figure 1 is a diagrammatic view of my improved plant for making axles; Fig. 2 is a plan view of the forming and reducing mill, motor and driving mechanism therefor; Fig. 3 is a side elevation of the same; Fig. 4 is a plan view of the finishing mill; Fig. 5 is a front elevation of the same; Fig. 6 is a transverse section of the first set of rolls of the reducing and forming mill, showing the position of the rolls at the beginning of the pass; Fig. 7 is the same, showing the position of the rolls at the completion of the pass, and the shape of the blank; Fig. 8 is the same of the second set of rolls of the reducing mill, just prior to the passage of the partially formed axle therethrough; Fig. 9 is the same, showing the position of the rolls upon the completion of the pass and the shape of the axle blank prior to its entrance to the finishing mill; Figs. 10, 11, 12 and 13 show, respectively, an elevation of the bar, of the incomplete axle after passage through the first set of reducing and forming rolls, of the incomplete axle after passage through the second set of rolls, of the axle after being acted upon by the finishing or straightening mill.

Referring to said drawings, 1 is a heating furnace of any suitable construction, and is provided with a charging device or mechanism, 2. 3 is a mill for converting the billet, after being discharged from said furnace, into a round, 4. 5 is a mill, arranged tandem with the last mentioned mill, having grooves in the face of the rolls thereof, capable of converting the round, 4, into a bar, 4', oval in cross-section. 6 is a mill in alinement with mill 5, and the rolls thereof have formed therein grooves capable of converting the oval bar, 4', into a bar, 4², round or circular in cross-section, and elongating the same. 7 is a conveyer of suitable construction, connecting mill 6 with the axle forming mill, 8. The said mills 3, 5 and 6 are driven by any suitable motor or engine, an electric motor, 9, being shown herein, and suitable driving mechanism, 10, and clutches, 11, are shown in connection with said motor for such purpose. The said mill 8 comprises two sets of vertically disposed rolls, each set having two rolls. The first set comprises rolls 12, 12, which are supported in suitable housings, 13, and are driven by power transmitted from said motor, 9, through suitable driving mechanism, 14, 14, herein shown to comprise a belt and gearing, in connection with suitable clutch mechanism, 15.

The said rolls, 12, 12, are of very considerable diameter, being at least five feet in diameter, and in each of the opposing working faces or peripheries of the same, is formed a die, 16, 16, which conforms in shape substantially to the shape of an axle blank. The ends of said dies are provided with depressions, 17, which forms the collars, 17', of the axle. A depression 18 is formed between said collars and the depression 19 which forms the wheel seat 19', for the formation of the journal bearing, 20, and a tapered groove, 21, gradually widening, from the wheel seat to the center, longitudinally of the bar, and decreasing gradually, in depth, from said wheel seat to the said center, and then gradually narrowing from the center to the other wheel seat, and correspondingly deepening from said center to said wheel seat. The configuration of this die is such that a circular bar, of the requisite cross sectional area throughout, passed between said rolls and subjected to the pressure between the die portions thereof, produces an axle blank, having collars at both ends, of circular cross-section, journal bearings oval in cross-section, wheel seats circular in cross-section and a portion between the wheel seats oval in cross-section and wider and of less thickness at the center longitudinally than at other points.

22, 22, are the other set of rolls comprising the reducing and forming mill. The said rolls, 22, 22, are similar in size to rolls 12, 12, and are arranged in alinement therewith, and are supported in housings, 23. Carrier rollers, 24, are interposed between the said sets of rolls, 12, 12 and 22—22, for the purpose of supporting the piece or blank in its transit from said rolls to the said rolls 22. The working faces of said rolls, 22, are provided with dies, which conform to the shape of an axle blank. The said dies having, at each end thereof a recess or depression, 26, which corresponds in shape, to the collars previously formed upon the axle blank; and are also formed with depressions, 27, 28, between the collars and the wheel seats, circular in all axial planes and of greater length than the portion of the bar between the collars and the wheel seats after its passage through the first set of rolls, 12, 12. This is for the purpose of reducing the oval portion of the blank at this point to a round, and elongating the same, to produce a round uniformly in cross-section, constituting one of the journal bearings of the axle. The said die has also depressions at both ends adjacent to the depressions for forming the bearings, circular in all axial planes, to form the wheel seats, and a groove, 29, circular in all axial planes, and tapering from the wheel seats to the center. The configuration of the die being such as to produce from an axle blank passed between said rolls and subjected to pressure therefrom in said dies, an axle blank having a collar at each end, circular in cross-section, journal bearings and wheel seats, circular in cross-section, and a portion between the wheel seats circular in cross-section at all points, tapering from the wheel seats to the center, and of less cross-section at the center than at other points.

It will be noted that the dies heretofore mentioned and described, instead of forming abrupt shoulders upon the inner and outer sides of the wheel seats, gradually reduce from said edges toward the center of the axle and toward the journal bearings, respectively, upon an angle. This avoids any possiblity of dragging down said edges in rolling the axle.

Another feature of importance in the construction of the dies is that the portion of the groove of the die from the center to the wheel seat, just before its exit from the first pass is deeper than the corresponding portion on the opposite end of the die. This is for the purpose, as heretofore stated, of providing sufficient material to enable the production of an axle having uniform thicknesses in corresponding parts.

In the construction of the rolls or dies, 12—12 and 22—22, the dies are cast or molded in the face thereof, and this obviates the necessity of the great expense and difficult roll turning to form such dies. It will be noted, also, that the dies are formed upon an extension of the true circle of the roll. This is to enable the dies to be adjusted as follows upon their shafts, namely, in the event of any warping in the casting of these dies, which might possibly throw the working faces out of axial relation with reference to the center, this can be adjusted by running a line from the three points where the greatest reduction occurs, namely, from the journal bearings and the center, toward the center transversely of the disks or rolls, the point where the lines intersect, would be the center of the orifice for the shaft on which said disks should be mounted.

The advantage of molding or casting the dies in the disks or rolls will be manifest to any one skilled in the art of roll turning. The advantages of the disposition of the several mills will likewise be manifest to those skilled in rolling mill practice. The advantages and merits of the reducing and forming mills is manifold, as an axle blank, complete in all its details excepting the machining of the journal bearings, can be produced in one-tenth the time now required to produce a similar article.

The finishing mill 24ª through which the axles are finally passed is shown in top plan view by Fig. 4 and in side elevation by Fig. 5.

Having described my invention, what I claim and desire to secure by Letters Patent is:

1. The herein described method of making axles, which consists in, first, heating a billet or bar of the requisite area, then by pressure converting the said bar into a blank, substantially conforming to the shape of the axle; the part between the wheel seats being oval in cross-section, wider and of less thickness at the longitudinal center than at other parts thereof, and the parts between the wheel-seats and the collars being oval of uniform cross-section; then flattening and narrowing and elongating the previously widened portions into a round, the part between the wheel-seats being circular in cross-section and said blank being of less cross-section at the center longitudinally thereof than at other parts, and the parts between the wheel seats and the collars being of uniform cross-section, thereby producing an axle blank circular in cross-section at all points and of less diameter at the center longitudinally and tapering therefrom to the wheel seats and of uniform cross-section at the journal bearings and the wheel seats.

2. The herein described method of making axles, which consists in, first, heating a billet or bar of the requisite area, than by pressure converting the said bar into a blank substantially conforming to the shape of the axle; the part between the wheel seats being oval in cross-section wider and of less thickness at the longitudinal center than at other parts thereof, one of the parts between the longitudinal center and one of the wheel seats being thicker on line vertical to its length and somewhat shorter than the other corresponding portion, and the parts between the wheel seats and the collars being oval of uniform cross-section; then by flattening and narrowing and elongating, converting the previously widened portions into a round, the part between the wheel seats being circular in cross-section and of less cross-section at the center longitudinally thereof than at the other parts, and the parts between the wheel-seats and the collars being of a uniform cross-section, thereby producing an axle blank circular in cross-section at all points and of less diameter at the center longitudinally and tapering therefrom to the wheel seats and of uniform cross-section at the journal bearings and the wheel seats.

3. The herein described method of making axles of varying cross section, which consists in heating a bar of the requisite area, then by the pressure of a die converting said bar into a blank, substantially conforming to the shape of the axle, the part between the wheel seats being oval in cross section, and gradually decreasing in thickness toward the middle where it is wider and of less thickness than at other points thereof, then by subsequent die pressure flattening and narrowing and elongating converting the previously widened portion into a portion having a substantially circular cross section.

4. The herein described method of making axles of varying cross sections which consists in first heating a bar of the requisite area, then by the pressure of a die converting the said bar into a blank substantially conforming to the shape of the axle, the parts between the wheel seats and the collars being of oval cross section, then by subsequent die pressure flattening and narrowing and elongating the said part between the collars and the wheel seats so as to provide a reduced portion which is substantially circular in cross section, the part between the wheel seats gradually tapering in thickness from opposite ends toward the middle thereof.

5. The herein described process of making axles of varying cross sections, which consists in applying pressure by means of a die to a bar of the requisite area so as to flatten certain portions thereof, one of said flattened portions having a varying cross section and being wider than other portions of the bar and subsequently rounding and elongating said flattened portion by means of a second die so as to provide a reduced portion having a substantially circular cross section.

6. The herein described method of making axles of varying cross sections, which consists in heating a bar of the requisite area, applying pressure to the bar by means of a die so as to flatten the portions between the wheel seats and also the portions between the wheel seats and the collars, the flattened portion between the wheel seats gradually decreasing in thickness and increasing in width from opposite ends toward the center thereof and subsequently flattening and narrowing and elongating the previously flattened portions by means of a second die so as to provide reduced portions having substantially circular cross sections, the cross section between the wheel seats and collars being uniform, while the cross section of the intermediate portion of the bar between the wheel seats gradually tapers in thickness toward the middle thereof.

7. A mill for forming axles, comprising two sets of rolls of two rolls each, the working faces of each of said rolls having a die formed therein and each die having spaced depressions at the ends thereof for forming the collars and wheel seats and shallow portions between the spaced depressions for flattening the intermediate portion of the axle, the distance between the depressions of the second set of dies being greater than the distance between the depressions of the first set of dies so that the bar will be elongated as it passes successively through the two sets of dies.

In testimony whereof, I have hereunto signed my name in the presence of two subscribing witnesses.

JOHN THOMAS ROWLEY.

In the presence of—
CLARENCE A. WILLIAMS,
JOHN. H. RONEY.